United States Patent
Miyawaki

(10) Patent No.: US 10,414,063 B2
(45) Date of Patent: Sep. 17, 2019

(54) HANDSAW

(71) Applicant: U.M. KOGYO INC., Hyogo (JP)

(72) Inventor: Shozo Miyawaki, Hyogo (JP)

(73) Assignee: U.M. KOGYO INC., Hyogo (JP)

( * ) Notice: Subject to any disclaimer, the term of this patent is extended or adjusted under 35 U.S.C. 154(b) by 0 days.

(21) Appl. No.: 15/751,554

(22) PCT Filed: Aug. 26, 2015

(86) PCT No.: PCT/JP2015/073992
§ 371 (c)(1),
(2) Date: Feb. 9, 2018

(87) PCT Pub. No.: WO2017/033305
PCT Pub. Date: Mar. 2, 2017

(65) Prior Publication Data
US 2018/0236685 A1    Aug. 23, 2018

(51) Int. Cl.
*B27B 33/10* (2006.01)
*B23D 61/12* (2006.01)
(Continued)

(52) U.S. Cl.
CPC ............ *B27B 33/10* (2013.01); *B23D 61/121* (2013.01); *B23D 61/122* (2013.01); *B27B 21/00* (2013.01);
(Continued)

(58) Field of Classification Search
CPC ......... B27B 33/10; B27B 21/00; B27B 21/04; B23D 61/021; B23D 61/023;
(Continued)

(56) References Cited

U.S. PATENT DOCUMENTS 1,421,520 A    4/1922  Mattson
1,675,565 A *  7/1928  Lee .................. B27B 33/10
                                                  30/166.3
(Continued)

FOREIGN PATENT DOCUMENTS

JP    S52-3787       12/1977
JP    H03-121802     12/1991
(Continued)

*Primary Examiner* — Phong H Nguyen
(74) *Attorney, Agent, or Firm* — Bacon & Thomas, PLLC

(57) ABSTRACT

A handsaw is provided with which chip clogging can be reduced significantly, the pitch of the tooth points can be made fine, the cut end face, called "top edge", of each tooth can be increased in area, and moreover, cutting resistance is kept small and good cutting performance is ensured. The handsaw has a plurality of saw teeth arranged on a longitudinal edge (21) of a saw blade (20). The saw teeth are configured as a combination of crosscutting teeth (X) of triangular or trapezoidal prism shape and ripping teeth (Y) of parallelogram-based prism shape. The prism-shaped teeth constituting the crosscutting teeth (X) and the ripping teeth (Y) are configured such that at least adjacent prism-shaped teeth rise at a same rising angle (θ) from an edge surface (21a) of the longitudinal edge (21) of the saw blade (20), to cause a space (S) between the adjacent prism-shaped teeth to be constant in a rising direction in which the teeth rise.

10 Claims, 10 Drawing Sheets

(51) Int. Cl.
*B27B 21/00* (2006.01)
*B27B 21/04* (2006.01)

(52) U.S. Cl.
CPC ............. *B27B 21/04* (2013.01); *Y10T 83/935* (2015.04); *Y10T 83/9319* (2015.04); *Y10T 83/9365* (2015.04); *Y10T 83/9367* (2015.04)

(58) Field of Classification Search
CPC .. B23D 61/025; B23D 61/121; B23D 61/122; Y10T 83/9319; Y10T 83/9326; Y10T 83/9348; Y10T 83/935; Y10T 83/9365; Y10T 83/9367; Y10T 83/9358; Y10T 83/9362
USPC .......................................................... 30/355
See application file for complete search history.

(56) References Cited

U.S. PATENT DOCUMENTS 2,703,593 A * 3/1955 Weller ................. B23D 61/021
 83/852
5,768,969 A * 6/1998 Dalfiume ............. B26D 1/0006
 493/363

FOREIGN PATENT DOCUMENTS

| | | |
|---|---|---|
| JP | 06-071101 | 10/1994 |
| JP | H09-29703 | 4/1997 |
| JP | 3060488 | 6/1999 |
| JP | 2003117903 A | 4/2003 |
| JP | 2013-052575 A | 3/2013 |

* cited by examiner (A)

(B)

(A)

(B)

(A)

(B)

(A)

(B)

US 10,414,063 B2

HANDSAW

TECHNICAL FIELD

The present invention relates to a handsaw.

BACKGROUND ART

Saws have a long history, and from its beginning to date, handsaws have been used by many people.

Meanwhile, electric power saws, which have been developed relatively recently, are electric power tools which cut wood and others with overwhelming horsepower supported by electric power. The same applies to chainsaws powered by engines. Although the electric power saws etc. having overwhelming power, so-called power saws, and the handsaws which cut using human power only, without relying on electric or or other power, are similar in that both use cutting teeth, in practice, they are considerably different in terms of concepts regarding their structures and functions, so they belong to substantially different technical fields.

FIG. 10 shows an example of a handsaw. A handsaw is generally made up of a grip 1, called a handle, and an elongated metal saw blade 2 attached to an end of the grip 1. A large number of teeth 3 are arranged on a longitudinal edge of the saw blade 2.

The handsaw shown in FIG. 8 (A), (B) is an example of the so-called ripsaw. The ripsaw is suitable for cutting wood along the grain. The ripsaw has a large number of triangular teeth 3 arranged on a longitudinal edge of the saw blade 2, and performs cutting with the distal ends of the triangular teeth 3 as cutting edges T. Each triangular tooth 3 has a base that constitutes a gullet or valley V together with the base of the adjacent triangular tooth 3. In the ripsaw, typically, the cutting edges T and the gullets V are aligned in the lateral direction, or, at a right angle with respect to the longitudinal direction of the saw blade 2.

The handsaw shown in FIG. 9 (A), (B) is an example of the so-called crosscut saw. The crosscut saw is suitable for cutting wood across the grain. In the crosscut saw, each triangular tooth 3 formed on a longitudinal edge of the saw blade 2 has sharp vertical cutting edges 3a, 3b provided on a pair of front and rear beveled portions on a distal end of the tooth. The vertical cutting edge denoted as 3a is in front with respect to a cutting direction D, and the vertical cutting edge denoted as 3b is at back with respect to the cutting direction D.

The vertical cutting edges 3a, 3b cut into the wood like knives, to sever the grain. The bases of adjacent triangular teeth 3 constitute a gullet V.

Some known crosscut saws have a cut end face 4, called "top edge" ("Uwame" in Japanese), formed by obliquely truncating a triangular tooth 3 near its distal end, and front and rear edges of the cut end face 4 serve as oblique horizontal cutting edges 4a and 4b. The cut end face 4 and the oblique horizontal cutting edges 4a and 4b can achieve the function of a ripsaw, or the function of, when cutting wood, carving and scraping off like a chisel, a part of the wood corresponding to the thickness of the saw blade 2.

PRIOR ART DOCUMENTS

Patent Documents

Patent Document 1: Japanese Utility Model Application Laid-Open No. H6-71101

Patent Document 2: Japanese Patent Application Laid-Open No. 2003-117903
Patent Document 3: Japanese Patent Application Laid-Open No. 2013-52575
Patent Document 4: Japanese Utility Model No. 3060488

DISCLOSURE OF THE INVENTION

Problems to be Solved by the Invention

Patent Document 1 above discloses a handsaw having triangular teeth (11) to (18), which are arranged alternately in opposite orientations to face each other and are also provided with top edges (11a) to (18a). This handsaw is similar to the above-described crosscut saw shown in FIG. 9.

The handsaw of Patent Document 1 includes triangular teeth, as in the case of the handsaw shown in FIG. 9, so each gullet between the adjacent triangular teeth (see the gullet V in FIG. 9) inevitably has a large V shape which tapers toward the bottom of the gullet. This poses a basic problem that these tapered gullets are clogged with chips, making the cutting quality or performance gradually deteriorate during the progress of the operation.

Patent Document 2 above discloses a saw blade which is provided with a cutting chips reservoir (7) made up of a recess (10) formed on an outer surface of a cutting tooth (2) for the purposes of preventing the spaces between respective sides of the saw and the cut surfaces of the wood from being clogged with cutting chips.

In the case of the saw blade of Patent Document 2, although the spaces between the respective sides of the saw and the cut surfaces of the wood may be prevented from being clogged with cutting chips, the tapered gullets between the triangular teeth would still likely be clogged with cutting chips, leaving unsolved the problem that the cutting performance gradually deteriorates during the cutting operation.

Patent Document 3 above discloses a saw blade which has teeth formed such that base portions (3B), (3B) of adjacent teeth (3), (3) are separate through the intermediary of an arcuate groove bottom surface (20) for the purposes of preventing clogging with chips.

In the case of the saw blade of Patent Document 3, the presence of the arcuate groove bottom surface (20) may lessen chip clogging. With the use of the triangular teeth, however, there still are tapered gullets, making it hard to sufficiently eliminate the chip clogging.

Further, in the case of the saw blade of Patent Document 3, in order to secure a large arc for the arcuate groove bottom surface (20), the beveled edge portions (7A), (7B) each need to have a fairly acute bevel angle (cutting edge angle thereof. This makes each tooth (3) reduced in thickness, posing a problem of reduced strength. Furthermore, the sharp cutting edge angles of the beveled edge portions (7A), (7B) pose another problem that the area of the top edge portion (8) inevitably becomes extremely small.

Patent Document 4 above discloses a saw which has crosscutting edges (2A), and ripping edges (2B) interspersed among the crosscutting edges (2A). In the case of this saw, the crosscutting edges (2A) cut off the right and left of a cut groove (8), and the ripping edges (2B) scrape off the unshaved portion at and around the center. This can effectively reduce the frictional resistance caused by the remaining portion at and around the center of the cut groove (8).

However, the crosscutting edges (2A) and the ripping edges (2B) in Patent Document 4 are both triangular teeth, so there still remains a problem that chip clogging cannot be fully eliminated due to the tapered gullets between the triangular teeth.

Basic problems with the triangular teeth will further be mentioned. Triangular teeth have been used for handsaws since a long time ago; it has been common practice to use the triangular teeth as the saw teeth.

The handsaw using the triangular teeth, however, has the basic problem as described above that there are tapered gullets between the triangular teeth, which would likely be clogged with chips.

Further, with the handsaw using the triangular teeth, there is another basic problem that the distances between tooth points at the tip ends of the teeth would likely become long, resulting in a coarse pitch in the longitudinal direction of the saw blade. When the triangular teeth are arranged more densely to make the pitch finer, the overlap the overlaps of the gullets between the respective sets of triangular teeth will increase, making chip clogging more likely to occur, leading to degradation in cutting performance. On the other hand, if the triangular teeth are arranged with larger spacing between the teeth, although the overlaps of the gullets between the triangular teeth may decrease and the chances of chip clogging may be lessened, the distances between the tooth points will become even longer, resulting in a coarser pitch, thereby worsening the cutting performance.

Further, in the case of the triangular tooth, while the tooth has a wide base, the distal end becomes narrower to be pointed. Thus, the "top edge" (see the cut end face 4 in FIG. 9) obtained by obliquely truncating the distal end would also likely become extremely small in area. With the top edge (cut end face 4) having such a small area, the shaving width becomes smaller than the saw blade width, in which case some portions may be left unshaved, and better cutting performance will not be expected.

In view of the foregoing, an object of the present invention is to solve various problems of the conventional techniques described above and to provide a handsaw that can significantly reduce chip clogging, with a departure from the long-held common wisdom that a handsaw should have triangular teeth. Another object of the present invention is to secure a fine pitch for the tooth points and also a large area for the cut end face, called "top edge", of each tooth. A further object of the present invention is to provide a handsaw which has a small cutting resistance and ensures good cutting performance.

Means for Solving the Problems

To accomplish the above objects, a handsaw according to the present invention has a first feature that it is a handsaw having a plurality of saw teeth arranged on a longitudinal edge of a saw blade, the saw teeth being configured as a combination of crosscutting teeth of triangular or trapezoidal prism shape and ripping teeth of parallelogram-based prism shape, the prism-shaped teeth constituting the crosscutting teeth and the ripping teeth being configured such that at least adjacent prism-shaped teeth rise at a same rising angle from an edge surface of the longitudinal edge of the saw blade, to cause a space between the adjacent prism-shaped teeth to be constant in a rising direction in which the teeth rise.

Further, the handsaw according to the present invention has, in addition to the above-described first feature, a second feature that the crosscutting teeth of triangular or trapezoidal prism shape are each configured to have one lateral face and one lateral edge, or two opposing lateral faces, rising flush with front and back surfaces of the saw blade, and the crosscutting teeth are arranged alternately in opposite orientations, whereas the ripping teeth of parallelogram-based prism shape are interspersed in an array of the crosscutting teeth and are each configured to have two opposing lateral faces rising flush with the front and back surfaces of the saw blade, and the ripping teeth are arranged alternately in opposite orientations.

Further, the handsaw according to the present invention has, in addition to the above-described second feature, a third feature that each crosscutting tooth of triangular or trapezoidal prism shape has a vertical cutting edge formed on a lateral edge of the flush lateral face that rises flush with the front or back surface of the saw blade, an obliquely-cut crosscutting end face of triangular or trapezoidal shape obtained by truncating the prism obliquely downward in a direction between rearward and perpendicular directions relative to a cutting direction from an apex of one of lateral edges of the flush lateral face(s) that is located most frontward in the cutting direction, and an inclined horizontal cutting edge formed on one of edges of the obliquely-cut crosscutting end face that does not belong to the flush lateral face(s) and is located frontward in the cutting direction, each ripping tooth of parallelogram-based prism shape has a vertical cutting edge formed on a lateral edge of the flush lateral face that rises flush with the front or back surface of the saw blade, an obliquely-cut ripping end face of parallelogram shape obtained by truncating the prism obliquely downward from one of two lateral faces not flush with the front or back surface of the saw blade that is located frontward in the cutting direction toward the other opposing lateral face, and an uninclined horizontal cutting edge formed on one of four edges of the obliquely-cut ripping end face that does not belong to the flush lateral faces and is located frontward in the cutting direction, and the obliquely-cut ripping end face has a top line slightly lower in height than the apex of the obliquely-cut crosscutting end face.

Further, the handsaw according to the present invention has, in addition to the above-described third feature, a fourth feature that the triangular prism-shaped teeth are isosceles triangular prism-shaped teeth.

Further, the handsaw according to the present invention has, in addition to the above-described third feature, a fifth feature that the trapezoidal prism-shaped teeth are isosceles trapezoidal prism-shaped teeth.

Further, the handsaw according to the present invention has, in addition to any of the first through fifth features described above, a sixth feature that the prism-shaped teeth are right prism-shaped teeth or oblique prism-shaped teeth.

Further, the handsaw according to the present invention has, in addition to any of the first through sixth features described above, a seventh feature that the same angle for the rising angles of the prism-shaped teeth has a tolerance of ±10 degrees, and the space between the prism-shaped teeth being constant in the rising direction includes any space with an increase within 20 degrees in angle or a reduction within 20 degrees in angle.

Further, the handsaw according to the present invention has, in addition to the above-described seventh feature, an eighth feature that the same angle for the rising angle of each prism-shaped tooth has a tolerance of ±5 degrees, and the space between the prism-shaped teeth being constant in the rising direction includes any space with an increase within 10 degrees in angle or a reduction within 10 degrees in angle.

Further, the handsaw according to the present invention has, in addition to any of the first through eighth features described above, a ninth feature that the lateral edges of each lateral face of each prism-shaped tooth are configured to rise parallel to each other or at a crossing angle of within ±10 degrees from the parallel.

Further, the handsaw according to the present invention has, in addition to the above-described ninth feature, a tenth feature that the lateral edges of each lateral face of each prism-shaped tooth are configured to rise parallel to each other or at a crossing angle of within ±5 degrees from the parallel.

Effects of the Invention

According to the handsaw recited in claim 1, the saw teeth arranged on the saw blade are prism-shaped teeth, and at least adjacent prism-shaped teeth are configured to rise at a same rising angle from the edge surface of a longitudinal edge of the saw blade. This causes the space between the adjacent prism-shaped teeth to be constant in the rising direction in which the teeth rise. Accordingly, the conventional problematic structure in which the space between the teeth becomes narrower from the tip ends toward the bases of the teeth is eliminated, and the conventional disadvantage that the cutting performance deteriorates as the tapered spaces between the teeth are clogged with chips can be fully overcome.

Moreover, as the saw tooth is of the prism shape, compared to the conventional triangular tooth wider in the base and narrower at the tip end, the dimensions remain unchanged from the base toward the tip end of the tooth. Thus, with the prism-shaped teeth, it is possible to arrange the teeth more densely as compared to the conventional triangular teeth. Further, with the prism-shaped teeth, the tip end of each tooth can be made wider in area as compared to the conventional triangular tooth. Accordingly, it is possible to increase the arrangement density of the cutting edges formed on the saw teeth and also increase the edge dimensions of the cutting edges. This leads to a significant improvement in cutting performance itself.

In addition, the prism-shaped teeth are configured as a combination of the crosscutting teeth of triangular or trapezoidal prism shape and the ripping teeth of parallelogram-based prism shape. With this configuration, the effects by the crosscutting teeth of making a cut with strong cutting force and the effects by the ripping teeth of favorably removing chips from within the cut groove and favorably shaving off the residual portion at the center in the cut groove, left unshaved by the crosscutting teeth, can be obtained together. Accordingly, in both cases of cutting wood in a direction perpendicular to the grain (for crosscutting) and cutting wood in a direction parallel to the grain (for ripping), good cutting performance with extremely small cutting resistance can be maintained constantly from start to finish of the cutting operation.

According to the handsaw recited in claim 2, in addition to the functions and effects obtained by the configuration recited in claim 1, the crosscutting teeth of triangular or trapezoidal prism shape are each configured to have one lateral face and one lateral edge, or two opposing lateral faces, rising flush with the front and back surfaces, respectively, of the saw blade. This configuration enables each crosscutting tooth to have its edge length extending fully across the thickness from the front to the back of the saw blade, ensuring a very efficient cutting operation. Further, a portion of the object to be cut with which the crosscutting tooth only comes into friction contact can be made small, so the resistance upon pulling the saw can also be reduced.

The ripping teeth of parallelogram-based prism shape are interspersed in an array of the crosscutting teeth, so that the ripping teeth can compensate for the drawbacks that would be suffered if the crosscutting teeth alone were disposed. That is, with the crosscutting teeth alone, an inverted V-shaped residual portion will remain at the center of the cut groove. The ripping teeth interspersed among the crosscutting teeth shave off this inverted V-shaped residual portion. Accordingly, the frictional resistance of the residual portion against the crosscutting teeth is reduced, and good cutting performance by the crosscutting teeth can be maintain ed. The ripping teeth interspersed can of course remove the chips from within the cut groove efficiently.

The crosscutting teeth and the ripping teeth are both disposed alternately in opposite orientations. This ensures a good balance as a saw as well.

Further, according to the handsaw recited in claim 3, in addition to the functions and effects obtained by the configuration recited in claim 2, each crosscutting tooth of triangular or trapezoidal prism shape has a vertical cutting edge formed on a lateral edge of the flush lateral face that rises flush with the front or back surface of the saw blade, and an inclined horizontal cutting edge formed on the obliquely-cut crosscutting end face of triangular or trapezoidal shape that is formed at the tip end of the tooth. The vertical cutting edge and the inclined horizontal cutting edge work together to cut into an object in the depth direction to form a groove and slice off the cut groove in the oblique horizontal direction.

Each ripping tooth of parallelogram-based prism shape has a vertical cutting edge formed on a lateral edge of the flush lateral face that rises flush with the front or back surface of the saw blade, and an uninclined horizontal cutting edge formed on the obliquely-cut ripping end face of parallelogram shape that is formed at the tip end of the tooth. The uninclined horizontal cutting edge is responsible for shaving off the V-shaped residual portion, which remains at the center in the cut groove unshaved by the crosscutting teeth, and for eliminating the chips.

Further, the obliquely-cut ripping end face is configured to have a top line slightly lower in height than the apex of the obliquely-cut crosscutting end face. This prevents the ripping teeth from protruding more than the crosscutting teeth and from adversely affecting the main cutting operation by the crosscutting teeth.

Further, according to the handsaw recited in claim 4, in addition to the functions and effects obtained by the configuration recited in claim 3, isosceles triangular prism-shaped teeth are used as the triangular prism-shaped teeth. Thus, the lateral faces facing each other and belonging respectively to the adjacent triangular prism-shaped teeth can be arranged in parallel. Accordingly, the space between the adjacent triangular prism-shaped teeth becomes constant, not only in the rising direction in which the saw teeth rise, but also in the direction perpendicular to the rising direction. This enables stable cutting operations, and also ensures good cutting performance.

Further, according to the handsaw recited in claim 5, in addition to the functions and effects obtained by the configuration recited in claim 3, isosceles trapezoidal prism-shaped teeth are used as the trapezoidal prism-shaped teeth. This allows the lateral faces facing each other and belonging respectively to the adjacent trapezoidal prism-shaped teeth to be arranged parallel to each other. Accordingly, the space between the adjacent trapezoidal prism-shaped teeth becomes constant not only in the rising direction in which the saw teeth rise, but also in the direction perpendicular to the rising direction. This ensures stable cutting performance.

Further, according to the handsaw recited in claim 6, in addition to the functions and effects obtained by the configuration recited in any one of claims 1 to 5, right prism-shaped teeth or oblique prism-shaped teeth are used as the prism-shaped teeth, so that a handsaw that hardly suffers chip clogging and ensures good cutting performance can be provided, not only for the handsaw having prism-shaped teeth arranged as right prisms to rise at a right angle from the edge surface of an edge of the saw blade, but also for the handsaw having prism-shaped teeth arranged as oblique prisms to rise obliquely from the edge surface of an edge of the saw blade.

Further, according to the handsaw recited in claim 7, in addition to the functions and effects obtained by the configuration recited in any one of claims 1 to 6, the adjacent prism-shaped teeth rise at a same angle, and this same angle is configured to have a tolerance of ±10 degrees. On the basis of such a tolerance of ±10 degrees of the rising angles of the prism-shaped teeth, any space between the prism-shaped teeth in the teeth rising direction that falls within the permissible range of an increase within 20 degrees in angle or a reduction within 20 degrees in angle can be regarded as being constant. Even if the space between the prism-shaped teeth is enlarged or reduced within 20 degrees in angle in the rising direction, the variation within such a range does not create an adverse result that the space between the teeth is clogged with chips, or does not adversely affect the cutting performance of the saw.

Further, according to the handsaw recited in claim 8, in addition to to the functions and effects obtained by the configuration recited in claim 7, the rising angles of the prism-shaped teeth are considered to be the same with a tolerance of ±5 degrees. On the basis of this, the space between the prism-shaped teeth in the teeth rising direction is allowed to be enlarged or reduced in the permissible range of within ten degrees in angle. When the variation of the space between the prism-shaped teeth is within the permissible range of ten degrees in angle in the rising direction, it is possible to sufficiently effectively prevent chip clogging in the space between the teeth, and to keep sufficiently favorable cutting performance of the saw.

Further, according to the handsaw recited in claim 9, in addition to the functions and effects obtained by the configuration recited in any one of claims 1 to 8, it is permitted that the lateral edges of each lateral face of each prism-shaped tooth rise parallel to each other or rise obliquely at a crossing angle within ±10 degrees from the parallel. Even if the prism of the prism-shaped tooth is reduced or enlarged in such a range within ten degrees in the rising direction, the tooth can exert the geometric characteristics as the prism-shaped tooth as long as the variation falls within that range. It does not create an adverse result that the space between the teeth is clogged with chips, or does not adversely affect the cutting performance of the saw.

Further, according to the handsaw recited in claim 10, in addition to the functions and effects obtained by the configuration recited in claim 9, the lateral edges of each lateral face of each prism-shaped tooth preferably rise parallel to each other or rise obliquely a at a crossing angle within ±5 degrees from the parallel. When the reduction or enlargement of the prism-shaped tooth in the rising direction of the prism falls within the range of not greater than five degrees, the tooth can sufficiently exert the geometric characteristics as the prism-shaped tooth. It is thus possible to sufficiently effectively prevent chip clogging in the space between the teeth, and to keep sufficiently favorable cutting performance of the saw.

MODES FOR CARRYING OUT THE INVENTION

Handsaws according to embodiments of the present invention will be described with reference to the drawings below.

First, a first embodiment will be described with reference to FIGS. 1 to 5.

Figure 1:
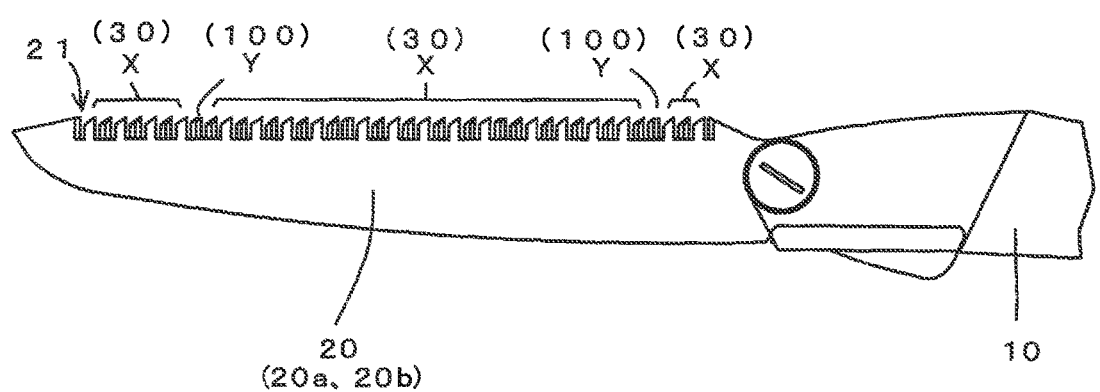
FIG. 1 is a front view of a handsaw according to a first embodiment of the present invention.
Figure 2:
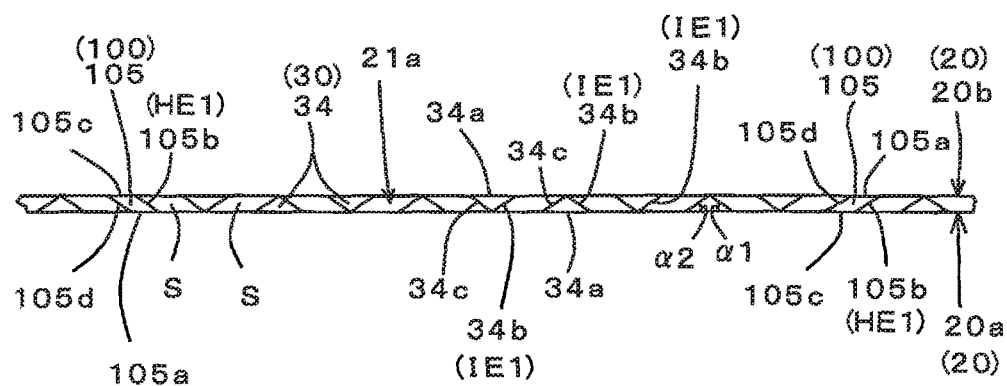
FIG. 2 shows details of the handsaw according to the first embodiment of the present invention, where (A) is a plan view and (B) is a front view.
Figure 2:
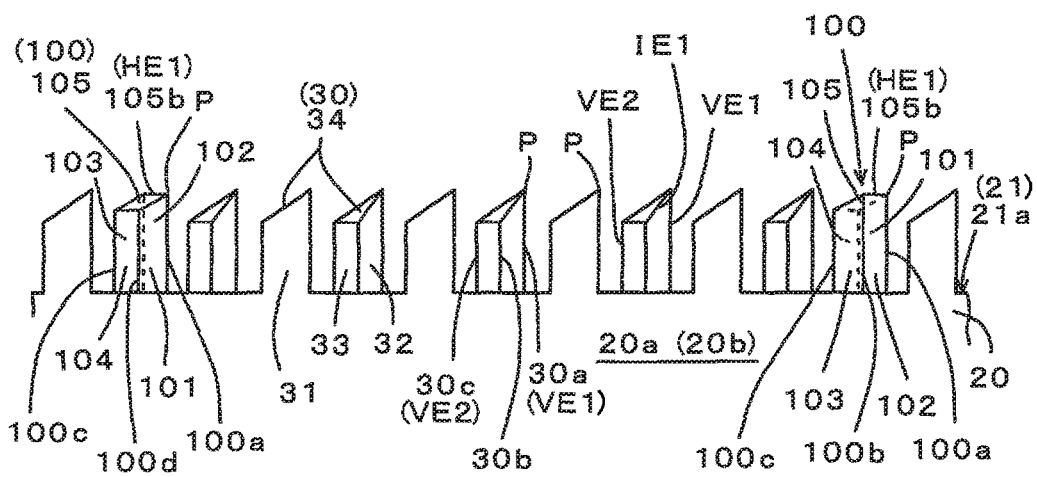
Figure 2:
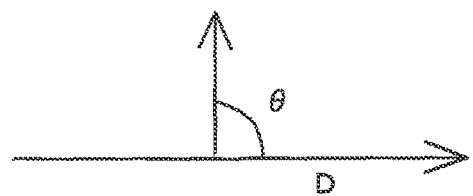
Figure 3:
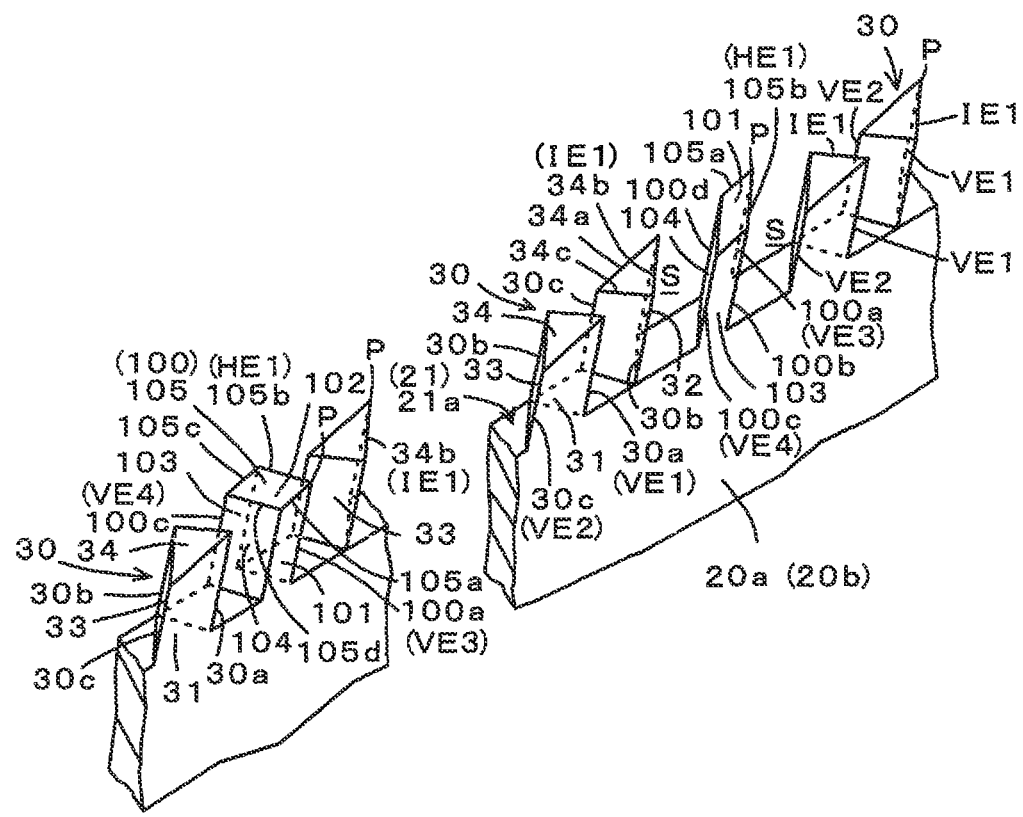
FIG. 3 is a perspective view showing details of the handsaw according to the first embodiment of the present invention.
Figure 4:
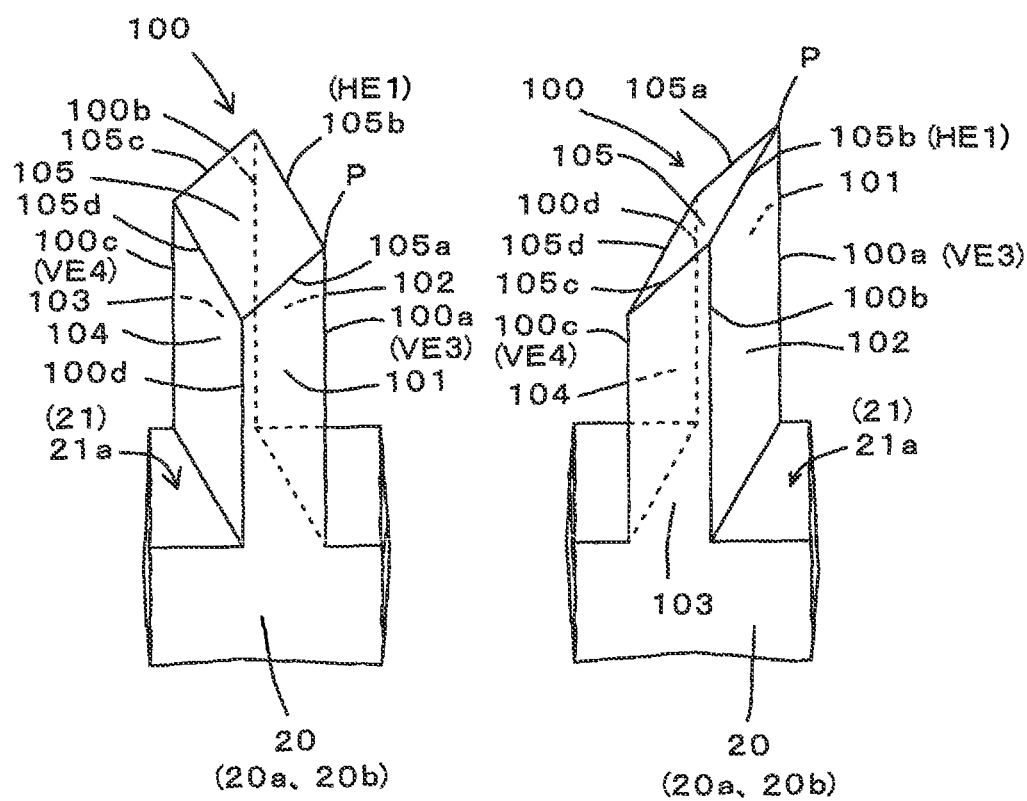
FIG. 4 is a perspective view of ripping teeth of parallelogram-based prism shape among the saw teeth of the handsaw according to the first embodiment of the present invention.

Referring to FIG. 1, a handsaw has a grip 10, a saw blade 20, and saw teeth. The grip 10 is only partly shown in the figure.

While the handsaw shown is a folding handsaw with the saw blade 20 foldable into the grip 10, the handsaw does not necessarily have to be of the folding type; any types of handsaws can be adapted.

The handsaw is a so-called single-edged saw, having the saw teeth arranged on one longitudinal edge 21 of the saw blade 20. Alternatively, it may of course be a double-edged saw with saw teeth arranged on both longitudinal edges 21 of the saw blade 20.

Further, while the handsaw shown in FIG. 1 is a pull-type saw, it may be a push-type saw.

Referring to FIGS. 2 to 5 as well, the saw teeth are each configured as a prism-shaped tooth having a prism shape.

The prism-shaped teeth as the saw teeth are made up of a combination of crosscutting teeth X and ripping teeth Y.

In the first embodiment, it is configured such that the ripping teeth Y, smaller in number than the crosscutting teeth X, are interspersed in an array of the crosscutting teeth X. Specifically, a ripping tooth Y is disposed as every tenth tooth in an array of the crosscutting teeth X. The proportion of the ripping teeth Y to the crosscutting teeth X, however, is not particularly limited.

In the first embodiment, the crosscutting teeth X are configured with triangular prism-shaped teeth 30. The ripping teeth Y are configured with parallelogram-based prism-shaped teeth 100.

The triangular prism-shaped teeth 30 as the crosscutting teeth X and the parallelogram-based prism-shaped teeth 100 as the ripping teeth Y are all configured to rise from an edge surface 21a of a longitudinal edge 21 of the saw blade 20.

For the triangular prism-shaped teeth 30, rising angles θ are set to be constant such that the teeth rise at a same angle in a same direction from the edge surface 21a. In the first embodiment, the rising angle θ of each prism-shaped tooth 30 is 90 degrees, at a right angle with respect to the edge surface 21a.

Similarly, for the parallelogram-based prism-shaped teeth 100, rising angles θ are set to be constant such that the teeth rise at a same angle in a same direction from the edge surface 21a. In the first embodiment, the rising angle θ of each parallelogram-based prism-shaped tooth 100 is the same as that of the triangular prism-shaped tooth 30. Specifically, it is 90 degrees, at a right angle with respect to the edge surface 21a.

With the rising angle θ constant for each triangular prism-shaped tooth 30 and each parallelogram-based prism-shaped tooth 100, any space S between the adjacent prism-shaped teeth, each being a triangular prism-shaped tooth 30 or a parallelogram-based prism-shaped tooth 100, becomes constant in the rising direction of the prism-shaped teeth. This eliminates the conventional problematic structure in which the space between the teeth becomes narrower from the tip ends toward the bases of the teeth. It is thus possible to fully solve the conventional disadvantage that the cutting performance deteriorates as the tapered spaces between the teeth are clogged with chips.

The rising angles θ of the triangular prism-shaped teeth 30 and the parallelogram-based prism-shaped teeth 100 are of course not limited to a right angle but may be oblique, as long as they are constant.

Here, in order for a space S between the adjacent prism-shaped saw teeth, including the triangular prism-shaped teeth 30 and the parallelogram-based prism-shaped teeth 100, to be constant in the rising direction of the teeth, it is only necessary that at least adjacent prism-shaped saw teeth, each being a triangular prism-shaped tooth 30 or a parallelogram-based prism-shaped tooth 100, rise at a same rising angle θ. When the adjacent prism-shaped teeth have the same rising angle θ, the space S between the prism-shaped saw teeth becomes constant in the teeth rising direction, thereby solving the disadvantage that the space S between the saw teeth becomes narrower from the tip ends toward the bases of the teeth.

It should be noted that the term "constant" used for the rising angle θ does not mean a constant value in the strict sense. Similarly, the "same" rising angle θ does not have to be the same in the strict sense. For the "constant" space S between the adjacent saw teeth as well, it does not have to be constant in the strict sense. These concepts each embrace more or less increase or decrease permitted based on the objects, functions, and effects of the present invention, which will be described later.

A triangular prism-shaped tooth 30 serving as the crosscutting tooth X in the first embodiment has three lateral edges 30a, 30b, 30c and three lateral faces 31, 32, 33 which rise from the edge surface 21a of the longitudinal edge 21 of the saw blade 20.

The triangular prism-shaped tooth 30 also has an obliquely-cut crosscutting end face 34 at its tip end, which is obtained by obliquely truncating the triangular prism.

The obliquely-cut crosscutting end face 34 of the triangular prism-shaped tooth 30 has three edges 34a, 34b, and 34c.

The edge 34a corresponds to the upper side of the lateral face 31, which is flush with either one of a front surface 20a and a back surface 20b of the saw blade 20.

The edge 34b corresponds to the upper side of the lateral face 32, which is one, located frontward in a cutting direction D, of the two lateral faces 32 and 33 traversing the front surface 20a and the back surface 20b of the saw blade 20.

The edge 34c corresponds to the upper side of the lateral face 33, which is the other one, located rearward in the cutting direction D, of the two lateral faces 32 and 33 traversing the front and back surfaces of the saw blade 20.

A triangular prism-shaped tooth 30 has one of its lateral faces configured to be a flush lateral face 31 that rises flush with one surface, 20a or 20b, of the front surface 20a and the back surface 20b of the saw blade 20.

The triangular prism-shaped teeth 30 are arranged alternately in opposite orientations, such that the flush lateral faces 31 of the respective triangular prism-shaped teeth 30 become flush alternately with the front surface 20a and the back surface 20b of the saw blade 20.

In each triangular prism-shaped tooth 30, the angle (lateral edge 30b) opposite the flush lateral face 31 is configured to be located in an intermediate position between the lateral edges 30a and 30c of the flush lateral face 31 in the longitudinal direction of the saw blade 20. In other words, the triangle of each triangular prism-shaped tooth 30 is shaped such that crossing angles α1, α2 between the flush lateral face 31 and the respective adjacent lateral faces 32, 33 both become less than 90 degrees.

In the case of the triangular prism-shaped teeth 30 in the first embodiment, the crossing angles α1 and α2 are set to be a same angle less than 90 degrees, so that the teeth each become an isosceles triangular prism-shaped tooth having a bilaterally symmetrical isosceles triangle base.

With the isosceles triangular prism-shaped teeth 30 adopted as the prism-shaped teeth, when the isosceles triangular prism-shaped teeth 30 are disposed to face to the right and to the left alternately on the longitudinal edge 21 of the saw blade 20, the lateral faces 32 and 33 facing each other and belonging respectively to the adjacent isosceles triangular prism-shaped teeth 30, 30 become parallel as seen in a plan view. That is, the space S between the adjacent isosceles triangular prism-shaped teeth 30 can be made constant in a plan view (in the direction perpendicular the direction perpendicular to the rising direction).

Each triangular prism-shaped tooth 30, with the lateral edges 30a and 30c belonging to the flush lateral face 31, is configured such that a front vertical cutting edge VE1 is provided on the longer lateral edge 30a located frontward in the cutting direction D and a rear vertical cutting edge VE2 is provided on the shorter lateral edge 30c located rearward in the cutting direction D.

Here, the cutting direction D refers to the direction, in which the saw is pulled in the case of a pull-type saw. In the case of a push-type saw, it refers to the direction in which the saw is pushed. In the case of the pull-type saw, the front vertical cutting edge VE1 located frontward in the cutting direction D primarily contributes to cutting.

The edge angle of the front vertical cutting edge VE1 (or, the crossing angle α1 between the flush lateral face 31 and the lateral face 32) and the edge angle of the rear vertical cutting edge VE2 (or, the crossing angle α2 between the flush lateral face 31 and the lateral face 33) are both set to be an acute angle less than 90 degrees, preferably an acute angle less than 45 degrees.

The front vertical cutting edges VE1 are main vertical cutting edges that cut a V-shaped groove into an object W to be cut as the saw blade 20 moves in the cutting direction D. The rear vertical cutting edges VE2 are subordinate vertical cutting edges relative to the front vertical cutting edges VE1, although they can make a V-shaped cut in the object W as the saw blade 20 returns in the direction opposite to the cutting direction D.

Each triangular prism-shaped tooth 30, with the three edges 34a, 34b, 34c belonging to the obliquely-cut crosscutting end face 34 formed at its tip end, is configured such that an inclined horizontal cutting edge IE1 is provided on the edge 34b not belonging to the flush lateral face 31 and located frontward in the cutting direction D.

The edge angle of the inclined horizontal cutting edge IE1 corresponds to a crossing angle between the obliquely-cut crosscutting end face 34 and the lateral face 32 functioning as the edge face of the front vertical cutting edge VE1. This crossing angle is set to be less than 90 degrees.

The inclined horizontal cutting edge IE1 and the front vertical cutting edge VE1 meet at a tooth point (apex) P of the triangular prism-shaped tooth 30.

As the saw blade 20 moves in the cutting direction D, the inclined horizontal cutting edge IE1 slices the surface of an object in an oblique horizontal direction, like chiseling. Here, the inclined horizontal cutting edges IE1 have their oblique horizontal directions set alternately in opposite orientations.

In the present embodiment, the obliquely-cut crosscutting end face 34 is formed by truncating the prism obliquely downward at a constant inclination angle, with the tooth point P as the apex. More specifically, the prism is truncated obliquely downward such that, as compared to the slope of the edge 34a of the obliquely-cut crosscutting end face 34 from the tooth point (apex) P, the slope of the edge 34b serving as the inclined horizontal cutting edge IE1 from the tooth point P becomes steeper.

Of course, any angles may be adopted as required for the inclination angles with respect to the tooth point P as the apex.

Chips cut off by a triangular prism-shaped tooth 30 temporarily remain in the space S between the lateral face 32 of the triangular prism-shaped tooth 30 and its neighboring triangular prism-shaped tooth 30 in front. Each triangular prism-shaped tooth 30, however, is of the prism shape, having dimensions unchanged from the base toward the tip end of the tooth. Moreover, every triangular prism-shaped tooth 30 has a constant rising angle θ and rises in the same direction. For example, they all rise at a right angle in the same direction. Therefore, the space S between each pair of adjacent triangular prism-shaped teeth 30 becomes constant in the rising direction of the triangular prism-shaped teeth 30. That is, a sufficient space S is secured between the teeth 30 down to to the bottom of the space S, without tapering toward the bottom. This fully eliminates the conventional disadvantage that the chips are forcibly pushed toward the bottom of the space S over time; substantially no chip clogging occurs over time. Accordingly, the saw keeps good cutting performance, which would otherwise deteriorate due to the chip clogging.

The triangular prism-shaped tooth 30 is of the prism shape, with no reduction in dimensions from the base toward the tip end of the tooth. Thus, as compared to the conventional triangular tooth, the obliquely-cut crosscutting end face 34 formed at the tip end of the tooth can be made sufficiently large in area, and the inclined horizontal cutting edge IE1 formed on the obliquely-cut crosscutting end face 34 can be made sufficiently long in edge length. This ensures a sufficiently wide oblique slicing width by the inclined horizontal cutting edge IE1 and, hence, improved slicing performance.

Further, as the triangular prism-shaped tooth 30 is of the prism shape, as compared to the conventional triangular tooth, a thin tooth with a smaller base can be used to form an obliquely-cut cut crosscutting end face 34 of the same area. Thus, in the case of arranging the saw teeth at the same pitch, the area of each obliquely-cut crosscutting end face 34 can be increased and the size of the space S between the bases of the teeth can also be increased in the case of the triangular prism-shaped teeth 30, as compared to the case of the conventional triangular teeth. The greater size of the space S between the bases of the teeth means that chip clogging is less likely to occur. The larger area of the obliquely-cut crosscutting end face 34 means that the inclined horizontal cutting edge IE1 offers better slicing performance.

On the other hand, in the case of securing spaces S of the same size between the teeth, a larger number of triangular prism-shaped teeth 30 can be arranged at a finer pitch, as compared to the conventional triangular teeth. This leads to a further improvement in cutting performance of the saw.

Further, with the isosceles triangular prism-shaped teeth adopted as the triangular prism-shaped teeth 30, the lateral faces 32 and 33 facing each other and belonging respectively to the adjacent triangular prism-shaped teeth 30 become parallel as seen in a plan view. Thus, the dimensions of the space S become constant and unchanged in the direction perpendicular to the rising direction as well. This lessens uneven distribution of the chips within the space S, whereby more stable cutting operations and cutting performance can be expected.

In the first embodiment, each triangular prism-shaped tooth 30 is configured such that, of its three lateral edges 30a, 30b, and 30c, two lateral edges 30a and 30c constitute lateral edges of the flush lateral face 31 that rises flush with one of the front and back surfaces, 20a (20b), of the saw blade 20, and the remaining lateral edge 30b constitutes a lateral edge that rises flush with the other surface, 20b (20a), of the saw blade 20. With this, it is configured such that each obliquely-cut crosscutting end face 34 becomes an oblique triangle that extends across the front and, back surfaces 20a, 20b of the saw blade 20.

With each obliquely-cut crosscutting end face 34 being configured as the oblique triangle extending across the front and back surfaces 20a, 20b of the saw blade 20, the inclined horizontal cutting edge IE1 formed on the obliquely-cut crosscutting end face 34 has the edge length (cutting edge length) that spans the entire thickness of the saw blade 20 between the front and back surfaces 20a and 20b.

With the inclined horizontal cutting edge IE1 formed on each obliquely-cut crosscutting end face 34 being made to traverse the entire thickness of the saw blade 20, during an operation of cutting an object, the inclined horizontal cutting edge IE1 can shave the object over the entire area in the thickness direction of the saw blade 20.

If the inclined horizontal cutting edge IE1 extends to cover less than a half in thickness direction of the saw blade 20, the inclined horizontal cutting edges IE1 will not be able to shave an object over the entire area in the thickness direction of the saw blade 20, in which case some part of the object may remain unshaved where the cutting edges only come into friction contact therewith. This is often the case with the conventional triangular teeth, and would lead to poor cutting performance and poor cutting efficiency.

When the inclined horizontal cutting edge IE1 has a length to traverse the thickness of the saw blade 20, with the triangular prism-shaped teeth 30 arranged alternatively in opposite orientations, the inclined horizontal cutting edge IE1 and the adjacent inclined horizontal cutting edge IE1 can work as a pair to shave the object over the entire area in the thickness direction of the saw blade 20, without leaving unshaved portions. According to the handsaw of the present invention, it is readily possible to increase the area of the obliquely-cut crosscutting end face 34, and it is also readily possible to cause the inclined horizontal cutting edge IE1 to have a length (edge length) that spans the entire area in the thickness direction of the saw blade 20. Making the cutting edge have a length to traverse the thickness of the saw blade is preferable from the standpoint of cutting performance and also from the standpoint of strength of the tooth.

A parallelogram-based prism-shaped tooth 100 serving as the ripping tooth Y has four lateral edges 100a, 100b, 10e, 100d and four lateral faces 101, 102, 103, 104 which rise from the edge surface 21a of the longitudinal edge 21 of the saw blade 20.

The parallelogram-based prism-shaped tooth 100 also has an obliquely-cut ripping end face 105 at its tip end, which is obtained by obliquely truncating the parallelogram-based prism.

The obliquely-cut ripping end face 105 of the parallelogram-based prism-shaped tooth 100 has four edges 105a, 105b, 105c, and 105d.

The edge 105a corresponds to the upper side of the lateral face 101, which is flush with either one of the front surface 20a and the back surface 20b of the saw blade 20.

The edge 105b corresponds to the upper side of the lateral face 102, which is one, located frontward in the cutting direction D, of the two lateral faces 102 and 104 traversing the front surface 20a and the back surface 20b of the saw blade 20.

The edge 105c corresponds to the upper side of the lateral face 103, which is flush with either one of the front surface 20a and the back surface 20b of the saw blade 20.

The edge 105d corresponds to the upper side of the lateral face 104, which is the other one, located rearward in the cutting direction D; of the two lateral faces 102 and 104 traversing the front surface 20a and the back surface 20b of the saw blade 20.

A parallelogram-based prism-shaped tooth 100 is configured such that the two lateral faces 101 and 103 rise flush with one and the other of the front surface 20a and the back surface 20b of the saw blade 20.

The parallelogram-based prism-shaped teeth 100 are arranged alternately in opposite orientations, such that the flush lateral faces 101 and 103 of the parallelogram-based prism-shaped teeth 100 become flush alternately with the front surface 20a and the back surface 20b, respectively, of the saw blade 20.

It is preferable that the parallelogram-based prism-shaped tooth 100 has a base of a parallelogram shape other than a square or rectangular shape. That is, it is preferable that the lateral faces 102 and 104 traverse the front and back surfaces 20a and 20b of the saw blade 20 at an oblique angle, rather than a right angle. Stated differently, it is configured such that the base of the parallelogram shape has two opposite acute angles and the other two opposite obtuse angles.

The angles of the parallelogram base of each parallelogram-based prism-shaped tooth 100 and the angles of the triangle base of each triangular prism-shaped tooth 30 are predetermined such that the lateral faces 102, 104 of the parallelogram-based prism-shaped tooth 100 traversing the front and back surfaces 20a, 20b of the saw blade 20 become parallel to the opposing lateral faces 32, 34, respectively, of the adjacent triangular prism-shaped teeth 30. In this case, each triangular prism-shaped tooth 30 is preferably a prism having an isosceles triangle base, in relation to the parallelogram-based prism-shaped tooth 100.

Each parallelogram-based prism-shaped tooth 100 is configured such that a front vertical cutting edge VE3 and a rear vertical cutting edge VE4 of acute angles are provided on the lateral edges 100a and 100 of the flush lateral faces 101 and 103, respectively, which rise flush with the front and back surfaces 20a and 20b of the saw blade 20.

The lateral edge 100a provided with the front vertical cutting edge VE3 corresponds to the lateral edge located most frontward in the cutting direction D of the parallelogram-based prism-shaped tooth 100, and the lateral edge 100c provided with the rear vertical cutting edge VE4 corresponds to the lateral edge located most rearward in the cutting direction D of the parallelogram-based prism-shaped tooth 100.

Each parallelogram-based prism-shaped tooth 100, with the four edges 105a, 105b, 105c, and 105d belonging to the obliquely-cut ripping end face 105 formed at its tip end, is configured such that an uninclined horizontal cutting edge HE1 is provided on the edge 105b that belongs to neither of the flush lateral faces 101 and 103 and is located frontward in the cutting direction D.

The edge angle of the uninclined horizontal cutting edge HE1 corresponds to a crossing angle between the obliquely-cut ripping end face 105 and the lateral face 102. This crossing angle as the edge angle is set to be less than 90 degrees.

The uninclined horizontal cutting edge HE1 and the lateral edge 100a meet at a tooth point (apex) P of the parallelogram-based prism-shaped tooth 100.

As the saw blade 20 moves in the cutting direction D, the uninclined horizontal cutting edge HE1 slices the surface of an object in a horizontal direction, like chiseling.

In the present embodiment, the obliquely-cut ripping end face 105 is formed, with the edge 105b of a constant height which traverses the edge surface 21a of the saw blade 20 obliquely rearward from the tooth point P being set as a top line, by truncating the prism obliquely downward at a constant inclination angle (edge angle) from the constant-height top line (105b) toward the edge 105d.

Of course, any angle may be adopted as required for the edge angle of the obliquely-cut ripping end face 105.

It is configured such that the edge 105b, which is the top line of the uninclined horizontal cutting edge HE1 of the parallelogram-based prism-shaped tooth 100, is slightly lower in height than the tooth point (apex) P of the triangular prism-shaped tooth 34.

Figure 5:
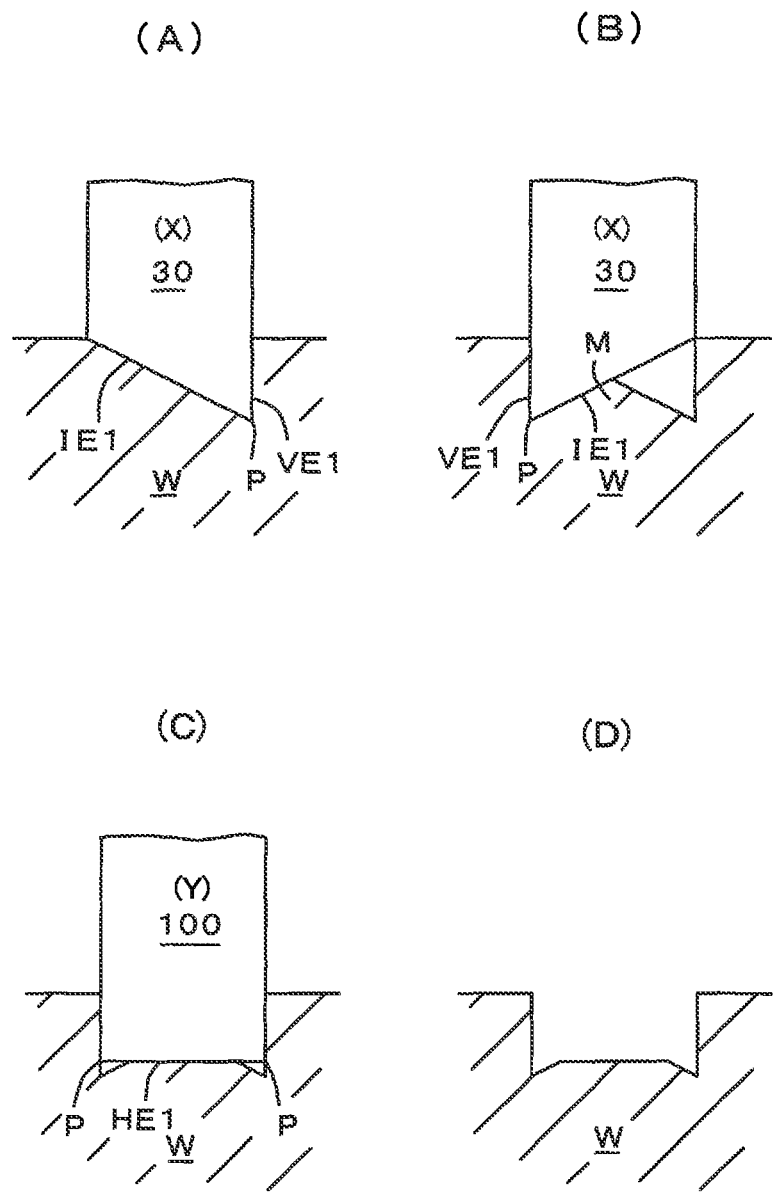
FIG. 5 is a cross-sectional view illustrating multiple stages in course of cutting an object using the handsaw according to the first embodiment of the present invention.

Referring to FIG. 5, a description will be made about the case of cutting an object W using the handsaw according to the first embodiment.

Referring first to FIG. 5(A), in the case where the object W is to be shaved by a triangular prism-shaped tooth 30 as the crosscutting tooth X, a triangular groove is formed in the object by the vertical cutting edge VE1 and the inclined horizontal cutting edge IE1.

Referring next to FIG. 5(B), in the case where the object W is to be shaved by a triangular prism-shaped tooth 30 opposite in orientation to the triangular prism-shaped tooth 30 in FIG. 5(A) above, a triangular groove is formed in the object by the vertical cutting edge VE1 and the inclined horizontal cutting edge IE1 in the opposite direction as compared to the case of FIG. 5(A). This creates an inverted V-shaped residual portion M at the center of the cut groove in the object W.

Referring next to FIG. 5(C), while the object W to be cut is shaved mostly by the triangular prism-shaped teeth 30 as the crosscutting teeth X as shown in FIGS. 5(A) and 5(B), the inverted V-shaped residual portion M left unshaved by the crosscutting teeth X is shaved off by the uninclined horizontal cutting edges HE1 of the parallelogram-based prism-shaped teeth 100 as the ripping teeth Y which are disposed at intervals. Further, the chips made by the crosscutting teeth X and remaining in the cut groove are removed by the uninclined horizontal cutting edges HE1. As such, the unshaved portion in the cut groove and the chips therein are eliminated efficiently.

FIG. 5(D) shows the state where the inverted V-shaped residual portion M has been, shaved off and the chips have also been eliminated from within the cut groove by the ripping teeth Y It should be noted that the uninclined horizontal cutting edge HE1 constituting the top line of the parallelogram-based prism-shaped tooth 100 serving as the ripping tooth Y is configured to be slightly lower in height than the tooth point P corresponding to the apex of the triangular prism-shaped tooth 30. This avoids the ripping teeth Y from being abutted against the object W ahead of the crosscutting teeth X, so that the crosscutting teeth X and the ripping teeth Y can play their roles in a synergistic manner.

Figure 6:
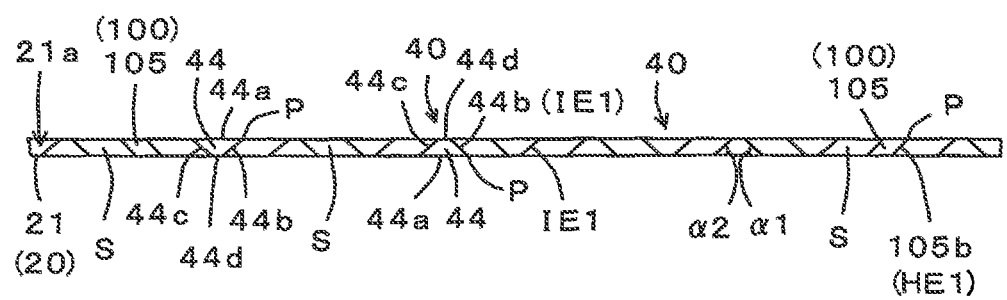
FIG. 6 shows details of a handsaw according to a second embodiment of the present invention, where (A) is a plan view and (B) is a front view.
Figure 6:
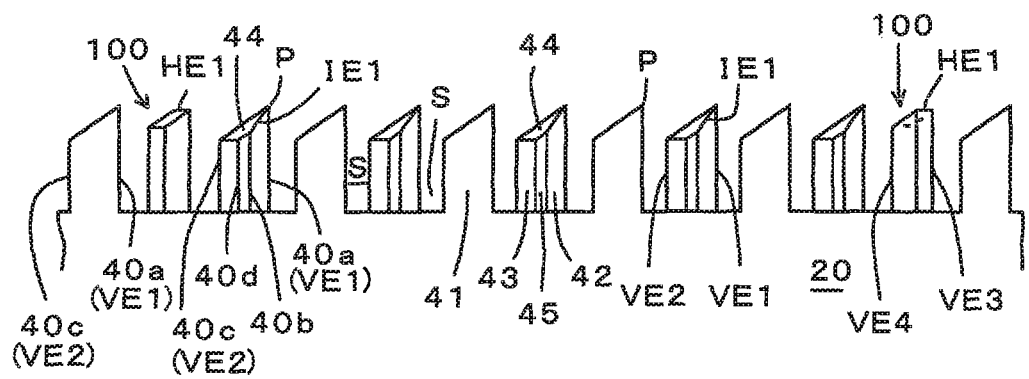
Figure 6:
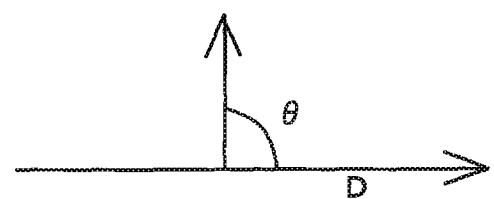

A second embodiment of the present invention will be described with reference to FIG. 6.

In the handsaw according to the second embodiment, trapezoidal prism-shaped teeth 40 are used as the prism-shaped teeth. The parallelogram-based prism-shaped teeth 100 are disposed similarly as in the first embodiment described above.

The triangular prism-shaped tooth 30 according to the first embodiment described above has a base of a triangular shape. When a corner of this triangle opposite its base is cut off, the base of the prism attains a trapezoidal shape. The second embodiment has such trapezoidal prism-shaped teeth 40 arranged on an edge surface 21a of a longitudinal edge 21 of a saw blade 20.

Each trapezoidal prism-shaped tooth 40 is configured such that, among four lateral edges 40a, 40b, 40c, and 40d on the prism, two lateral edges 40a and 40c constitute lateral edges of a flush lateral face 41 that rises flush with one of front and back surfaces, 20a (20b), of the saw blade 20, and the remaining two lateral edges 40b and 40d constitute lateral edges of a second flush lateral face 45 that rises flush with the other of the front and back surfaces, 20b (20a), of the saw blade 20. The second flush lateral face 45 is smaller in area than the flush lateral face 41.

Each trapezoidal prism-shaped tooth 40 has two lateral faces 42, 43 in addition to the flush lateral face 41 and the second flush lateral face 45.

The trapezoidal prism-shaped teeth 40 are configured such that they rise in a same direction from the edge surface 21a of the longitudinal edge 21 of the saw blade 20, or, such that their rising angles θ become constant. The rising angle θ of the trapezoidal prism-shaped teeth 40 in the second embodiment is 90 degrees, or, perpendicular. The rising angle θ of each trapezoidal prism-shaped tooth is not limited to the right angle; the teeth may be slanted as long as their angles are constant.

The trapezoidal prism-shaped tooth 40 has an obliquely-cut crosscutting end face 44 at its tip end, which is obtained by obliquely truncating the trapezoidal prism.

The obliquely-cut crosscutting end face 44 has four edges 44a, 44b, 44c, and 44d. The edge 44a corresponds to the upper side of the flush lateral face 41, the edge 44b corresponds to the upper side of the lateral face 42, the edge 44c corresponds to the upper side of the lateral face 43, and the edge 44d corresponds to the upper side of the second flush lateral face 45.

The trapezoidal prism-shaped teeth 40 are arranged alternately in opposite orientations, such that their flush lateral faces 41 become flush alternately with the front surface 20a and the back surface 20b of the saw blade 20.

In each trapezoidal prism-shaped tooth 40, crossing angles α1 and α2 between the flush lateral face 41 and the adjacent lateral faces 42 and 43, respectively both become less than 90 degrees.

The trapezoidal prism-shaped tooth 40 according to the second embodiment is configured as an isosceles trapezoidal prism-shaped tooth 40 having a bilaterally symmetrical isosceles trapezoid base.

With the isosceles trapezoidal prism-shaped teeth 40 adopted, when the isosceles trapezoidal prism-shaped teeth 40 are disposed to face to the right and to the left alternately on the longitudinal edge 21 of the saw blade 20, the lateral faces 42 and 43 facing each other and belonging respectively to the adjacent isosceles trapezoidal prism-shaped teeth 40, 40 become parallel as seen in a plan view. That is, the space S between the adjacent isosceles trapezoidal prism-shaped teeth 40 can be made constant in a plan view (in the direction perpendicular to the rising direction).

Each trapezoidal prism-shaped tooth 40, with the lateral edges 40a and 40c belonging to the flush lateral face 41, is configured such that a front vertical cutting edge VE1 is provided on the longer lateral edge 40a located frontward in the cutting direction D and a rear vertical cutting edge VE2 is provided on the shorter lateral edge 40c located rearward in the cutting direction D. The edge angle of the front vertical cutting edge VE1 (or, the crossing angle α1 between the lateral faces 41 and 42) and the edge angle of the rear vertical cutting edge (or, the crossing angle α2 between the lateral faces 41 and 43) are both set to be an acute angle less than 90 degrees, preferably an acute angle less than 45 degrees.

The rear vertical cutting edges VE2 are subordinate vertical cutting edges relative to the front vertical cutting edges VE1, although they can make a V-shaped cut in the object as the saw blade 20 returns in the direction opposite to the cutting direction D.

In each trapezoidal prism-shaped tooth 40, an inclined horizontal cutting edge IE1 is provided on the edge 44b of the obliquely-cut crosscutting end face 44 formed at the tip end of the tooth. The inclined horizontal cutting edge IE1 is located frontward in the cutting direction D, and is formed to obliquely traverse the thickness of the saw blade 20.

The edge angle of the inclined horizontal cutting edge IE1 corresponds to a crossing angle between the obliquely-cut crosscutting end face 44 and the lateral face 42 functioning as the edge face of the front vertical cutting edge VE1. This crossing angle is set to be less than 90 degrees. The inclined horizontal cutting edge IE1 and the front vertical cutting edge VE1 meet at a tooth point (apex) P of the trapezoidal prism-shaped tooth 40.

Chips cut off by a trapezoidal prism-shaped tooth 40 temporarily remain in the space S in front of the trapezoidal prism-shaped tooth 40. However, the space S between each pair of teeth 40 does not taper; rather, a sufficient space is secured to the bottom of the space S by virtue of the configuration described above. Accordingly; there occurs no degradation in cutting performance of the saw due to the chips pushed toward the bottom of the space S over time. The saw keeps good cutting performance.

In the case of the trapezoidal prism-shaped teeth 40, as compared to the triangular prism-shaped teeth 30, the teeth themselves can be increased in strength, although each tooth may take a longer width in the longitudinal direction of the saw blade 20.

Other functions and effects of the handsaw using the trapezoidal prism-shaped teeth 40 are similar to the functions and effects described above for the handsaw using the triangular prism-shaped teeth 30.

Figure 7:
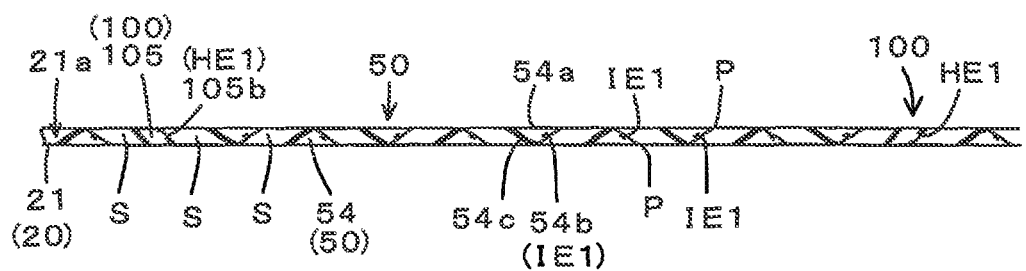
FIG. 7 shows details of a handsaw according to a third embodiment of the present invention, where (A) is a plan view and (B) is a front view.
Figure 7:
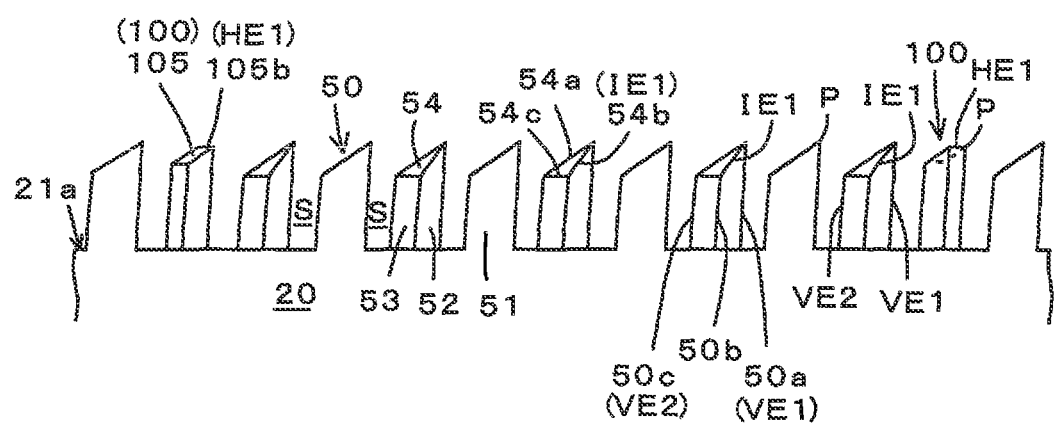
Figure 7:
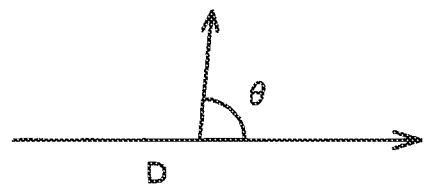
Figure 8:
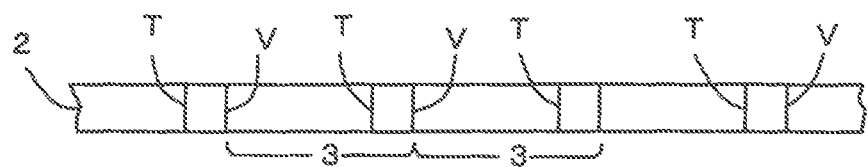
FIG. 8 shows an example of a conventional ripsaw, where (A) is a plan view and (B) is a perspective view observed from the front side.
Figure 8:
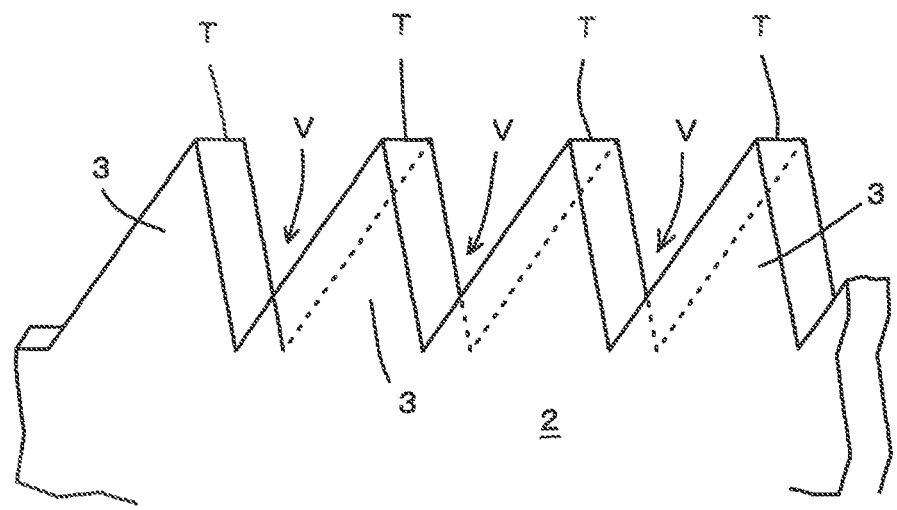
Figure 9:
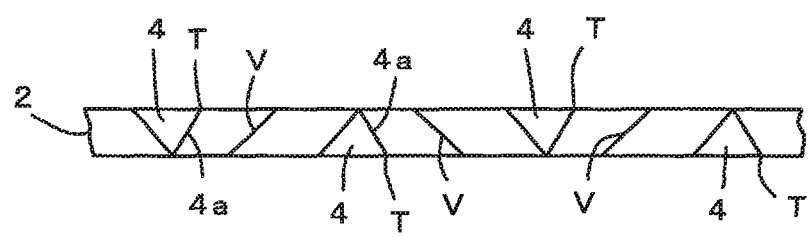
FIG. 9 shows an example of a conventional crosscut saw, where (A) is a plan view and (B) is a front view.
Figure 9:
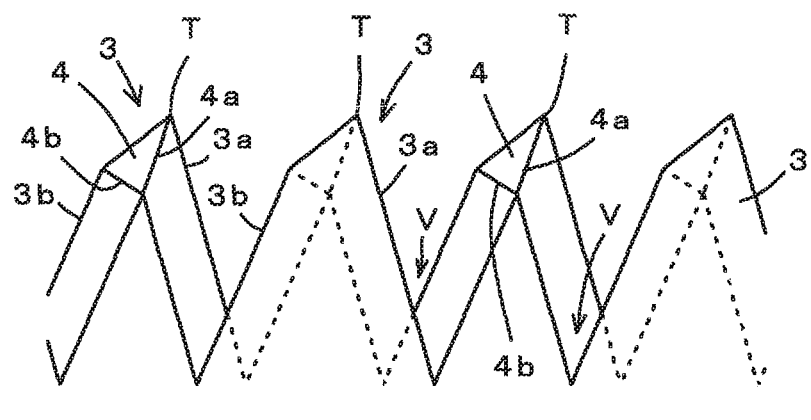
Figure 10:
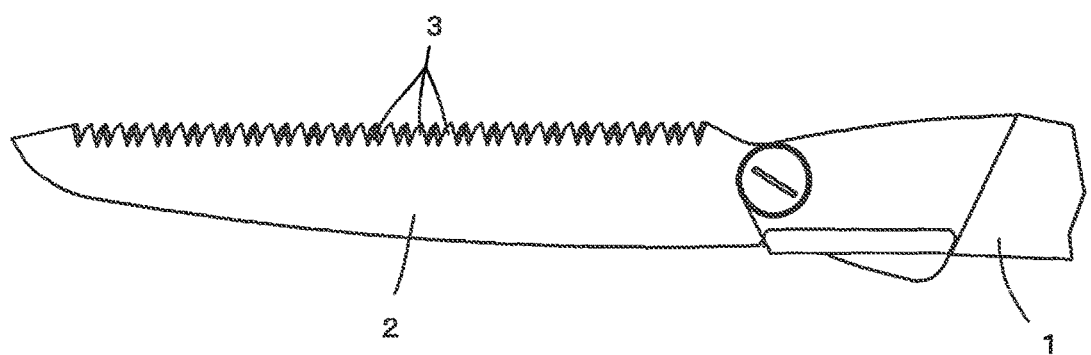
FIG. 10 shows an example of a conventional handsaw.

A third embodiment of the present invention will be described with reference to FIG. 7.

In the first and second embodiments described above, the handsaws had right prism-shaped teeth as the prism-shaped teeth 30 and 40, respectively. The triangular prism-shaped teeth 30 and the trapezoidal prism-shaped teeth 40 were configured to rise at a right rising angle θ from the edge surface 21*a* of the longitudinal edge 21 of the corresponding saw blade 20.

The parallelogram-based prism-shaped teeth 100 are disposed similarly as in the first embodiment described above.

In the third embodiment, a handsaw has oblique prism-shaped teeth 50 which rise at an oblique rising angle θ from an edge surface 21*a* of a longitudinal edge 21 of a saw blade 20.

The rising angle θ of the oblique prism-shaped teeth 50 is often set as a constant angle slightly inclined toward the cutting direction D of the handsaw from the right angle, besides the right angle of 90 degrees. With the rising angle θ thus set constant, the space S between the adjacent oblique prism-shaped teeth 50, 50 becomes constant in the rising direction of the teeth 50. With this, the space S is prevented from tapering toward the bases of the teeth, and the space S with adequate dimensions is secured.

Although the rising angle θ of the oblique prism-shaped teeth 50 is not necessarily limited, it is preferably set within ±30 degrees from the perpendicular direction (90 degrees).

Other features of the handsaw of the third embodiment having the oblique prism-shaped teeth 50 are similar to those of the handsaw of the first embodiment.

The reference characters with any number from 30 to 39 for the right triangular prism-shaped tooth 30 in the first embodiment, i.e. the lateral faces 31, 32, 33, obliquely-cut crosscutting end face 34, lateral edges 30*a*, 30*b*, 30*c*, and edges 34*a*, 34*b*, 34*c*, correspond respectively to lateral faces 51, 52, 53, obliquely-cut crosscutting end face 54, lateral edges 50*a*, 50*b*, 50*c*, and edges 54*a*, 54*b*, 54*c* of the oblique triangular prism-shaped tooth 50.

Further, the reference characters for the space S, vertical cutting edges VE1, VE2, inclined horizontal cutting edge IE1, and apex P are identical to those used in the first embodiment.

A description will further be made primarily about the permissible ranges for the dimensional relationships among the parts constituting the handsaw according to each embodiment of the present invention.

First, the rising angle θ of each prism-shaped tooth 30 (40, 50), 100 from the edge surface 21*a* of the longitudinal edge 21 of the saw blade 20 will be mentioned. The rising angle θ may be set to, for example, 90 degrees (perpendicular), or a constant angle tilted by a certain angle in the longitudinal direction. The constant rising angle θ, however, is not required to be a strictly precise angle for all the prism-shaped teeth 30 (40, 50), 100 being arranged. For each prism-shaped tooth 30 (40, 50), 100 arranged, the rising angle θ with a difference within ±10 degrees is considered to be within tolerance, and is included in the constant rising angle θ. The difference within ±10 degrees of the rising angle θ of each prism-shaped tooth 30 (40, 50), 100 results in an enlargement or reduction of the space S between the adjacent prism-shaped teeth 30 (40, 50), 100, within 20 degrees in the rising direction of the space S. The variation within such a range, however, does not create an adverse result that the spaces S between the teeth are clogged with chips, or does not adversely affect the cutting performance of the saw.

Alternatively, the prism-shaped teeth 30 (40, 50), 100 may be arranged such that the rising angle θ changes gradually in the longitudinal direction of the saw blade 20. In such a case, it is expected that the tooth on one end and the tooth on the other end in the longitudinal direction of the saw blade 20 will have their rising angles θ considerably different from each other. For a respective pair of adjacent prism-shaped teeth 30 (40, 50), 100, however, their rising angles θ are almost the same. In this case, it can be said that the space S between the adjacent prism-shaped teeth 30 (40, 50), 100 is substantially constant in the teeth rising direction. Thus, such a teeth arrangement is also within the scope of the present invention.

The space S between the adjacent prism-shaped teeth 30 (40, 50), 100 will be mentioned. For this space S as well, although the space S is set to be constant in the rising direction, any space with an increase within 20 degrees in angle or a reduction within 20 degrees in angle can be considered to be within a permissible range, and included in the constant space. This is because, when the rising angle θ of each prism-shaped tooth 30 (40, 50), 100 has a difference within ±10 degrees, the space S between, the prism-shaped teeth correspondingly increases or decreases within 20 degrees in angle in the rising direction. The enlargement or reduction of the space S within such a range, however, does not create an adverse result that the spaces S between the teeth are clogged with chips, or does not adversely affect the cutting performance of the saw.

It is more preferable that the variation in the rising angles θ of the prism-shaped teeth 30 (40, 50), 100 is within ±5 degrees. That is, it is more preferable that the rising angles θ of the prism-shaped teeth 30 (40, 50), 100 are set to be constant with a tolerance of ±5 degrees. Correspondingly, it is preferable that the space S between the adjacent prism-shaped teeth 30 (40, 50), 100 is set to be constant including an increase within ten degrees in angle and a reduction within ten degrees in angle in the rising direction. When the changes in the spaces S between the prism-shaped teeth are within the permissible range of ten degrees in the rising direction, chip clogging in the spaces S between the teeth can be prevented sufficiently effectively, making it possible to keep sufficiently good cutting performance of the saw. Accordingly, any handsaws using the prism-shaped teeth falling within the permissible ranges as described above are also within the scope of the present invention.

For each of the lateral faces 31, 32, 33 (41, 42, 43, 45, 51, 52, 53), 101, 102, 103, 104 of the respective prism-shaped teeth 30 (40, 50), 100, the lateral edges on its both sides, i.e. 30*a* and 30*c*, 30*a* and 30*b*, 30*b* and 30*c* (40*a* and 40*c*, 40*a* and 40*b*, 40*b* and 40*d*, 40*c* and 40*d*, 50*a* and 50*c*, 50*a* and 50*b*, 50*b* and 50*c*), 100*a* and 100*d*, 100*a* and 100*b*, 100*b* and 100*c*, 100*c* and 100*d*, are configured to be parallel to each other. However, they do not have to be precisely parallel;

they may be configured to rise obliquely at a crossing angle of within ±10 degrees from the parallel. That is, the present invention embraces the case where the lateral edges of each lateral face rise obliquely at a crossing angle of within ±10 degrees from the parallel.

Although it is necessary in a strict sense that the lateral edges of every lateral face are parallel to each other in the prism-shaped teeth 30 (40, 50), 100, when the displacement from the parallel is relatively small, or, when the displacement is within ±10 degrees from the parallel, then the teeth can exert the geometric characteristics as the prism-shaped teeth. They do not create an adverse result that the spaces S between the teeth are clogged with chips, or do not adversely affect the cutting performance of the saw. Accordingly, the prism-shaped teeth falling within such a range are also regarded as the prism-shaped teeth of the present invention.

It is preferable that, for each of the lateral faces 31, 32, 33 (41, 42, 43, 45, 51, 52, 53), 101, 102, 103, 104 of the respective prism-shaped teeth 30 (40, 50), 100, the lateral edges on its both sides, i.e. 30a and 30c, 30a and 30b, 30b and 30c (40a and 40c, 40a and 40b, 40b and 40d, 40c and 40d, 50a and 50c, 50a and 50b, 50b and 50c), 100a and 100d, 100a and 100b, 100b and 100c, 100c and 10d, are configured to be parallel to each other, or if not parallel, at a crossing angle of within ±5 degrees from the parallel. This is because, when the reduction or enlargement of each of the prism-shaped teeth in the rising direction of the prism falls within the range of ±5 degrees, the teeth can sufficiently exert the geometric characteristics as the prism-shaped teeth, and it is possible to sufficiently effectively prevent chip clogging in the spaces S between the teeth, and to keep sufficiently favorable cutting performance of the saw.

It should be noted that the thickness of the saw blade 20 itself may be slightly increased near the edge of the saw blade where the teeth 30, 40, 50, 100 are to be formed, as compared to the middle of the saw blade. This is for the purposes of reducing friction between the saw blade 20 and the object to be cut during the cutting operation. When such a configuration is adopted, each tooth 30, 40, 50, 100 may become a mushroom-shaped prism tooth which slightly expands from the base toward the tip end of the tooth like a mushroom. The prism tooth of such a mushroom shape is also regarded as the prism-shaped tooth according to the present invention.

INDUSTRIAL APPLICABILITY

The handsaw according to the present invention has an industrial application as means for manually cutting wood, plastic, or other objects.

DESCRIPTION OF THE REFERENCE CHARACTERS

10 grip
20 saw blade
20a front surface of saw blade
20b back surface of saw blade
21 longitudinal edge of saw blade
21a edge surface of longitudinal edge of saw blade
30 triangular prism-shaped tooth
30a to 30c lateral edge of triangular prism-shaped tooth
31 flush lateral face of triangular prism-shaped tooth
32, 33 lateral face of triangular prism-shaped tooth
34 obliquely-cut crosscutting end face
34a to 34c edge
40 trapezoidal prism-shaped tooth
40a to 40d lateral edge of trapezoidal prism-shaped tooth
41 flush lateral face of trapezoidal prism-shaped tooth
42, 43 lateral face of trapezoidal prism-shaped tooth
44 obliquely-cut crosscutting end face
44a to 44d edge
45 second flush lateral face of trapezoidal prism-shaped tooth
50 oblique prism-shaped tooth
50a to 50c lateral edge of oblique prism-shaped tooth
51 flush lateral face of oblique prism-shaped tooth
52, 53 lateral face of oblique prism-shaped tooth
54 obliquely-cut crosscutting end face
54a to 54c edge
100 parallelogram-based prism-shaped tooth
100a to 100d lateral edge of parallelogram-based prism-shaped tooth
101, 103 flush lateral face of parallelogram-based prism-shaped tooth
102, 104 lateral face of parallelogram-based prism-shaped tooth
105 obliquely-cut ripping end face
105a to 105d edge
α1, α2 crossing angle of flush lateral face with respective adjacent lateral face
θ rising angle
D cutting direction
M inverted V-shaped residual portion
P apex (tooth point)
S space
VE1 front vertical cutting edge
VE2 rear vertical cutting edge
VE3 front vertical cutting edge
VE4 rear vertical cutting edge
IE1 inclined horizontal cutting edge
HE1 uninclined horizontal cutting edge
W object to be cut
X crosscutting tooth
Y ripping tooth

What is claimed is:

1. A handsaw having a plurality of saw teeth arranged on a longitudinal edge of a saw blade, the saw teeth being configured as a combination of crosscutting teeth of triangular or trapezoidal prism shape and ripping teeth of parallelogram-based prism shape, the prism-shaped teeth constituting the crosscutting teeth and the ripping teeth being configured such that at least adjacent prism-shaped teeth rise at a same rising angle from an edge surface of the longitudinal edge of the saw blade, to cause a space between the adjacent prism-shaped teeth to be constant in a rising direction in which the teeth rise.

2. The handsaw according to claim 1, wherein the crosscutting teeth of triangular or trapezoidal prism shape are each configured to have one lateral face and one lateral edge, or two opposing lateral faces, rising flush with front and back surfaces of the saw blade, and the crosscutting teeth are arranged alternately in opposite orientations, whereas the ripping teeth of parallelogram-based prism shape are interspersed in an array of the crosscutting teeth and are each configured to have two opposing lateral faces rising flush with the front and back surfaces of the saw blade, and the ripping teeth are arranged alternately in opposite orientations.

3. The handsaw according to claim 2, wherein
each crosscutting tooth of triangular or trapezoidal prism shape has a vertical cutting edge formed on a lateral edge of the flush lateral face that rises flush with the front or back surface of the saw blade, an obliquely-cut crosscutting end face of triangular or trapezoidal shape obtained by truncating the prism obliquely downward in a direction between rearward and perpendicular directions relative to a cutting direction from an apex of one of lateral edges of the flush lateral face(s) that is located most frontward in the cutting direction, and an inclined horizontal cutting edge formed on one of edges of the obliquely-cut crosscutting end face that does not belong to the flush lateral face(s) and is located frontward in the cutting direction, each ripping tooth of parallelogram-based prism shape has a vertical cutting edge formed on a lateral edge of the flush lateral face that rises flush with the front or back surface of the saw blade, an obliquely-cut ripping end face of parallelogram shape obtained by truncating the prism obliquely downward from one of two lateral faces not flush with the front or back surface of the saw blade that is located frontward in the cutting direction toward the other opposing lateral face, and an uninclined horizontal cutting edge formed on one of four edges of the obliquely-cut ripping end face that does not belong to the flush lateral faces and is located frontward in the cutting direction, and the obliquely-cut ripping end face has a top line slightly lower in height than the apex of the obliquely-cut crosscutting end face.

4. The handsaw according to claim 3, wherein the triangular prism-shaped teeth are isosceles triangular prism-shaped teeth.

5. The handsaw according to claim 3, wherein the trapezoidal prism-shaped teeth are isosceles trapezoidal prism-shaped teeth.

6. The handsaw according to claim 1, wherein the prism-shaped teeth are right prism-shaped teeth or oblique prism-shaped teeth.

7. The handsaw according to claim 1, wherein the same angle for the rising angles of the prism-shaped teeth has a tolerance of ±10 degrees, and the space between the prism-shaped teeth being constant in the rising direction includes any space with an increase within 20 degrees in angle or a reduction within 20 degrees in angle.

8. The handsaw according to claim 7, wherein the same angle for the rising angle of each prism-shaped tooth has a tolerance of ±5 degrees, and the space between the prism-shaped teeth being constant in the rising direction includes any space with an increase within 10 degrees in angle or a reduction within 10 degrees in angle.

9. The handsaw according to claim 1, wherein the lateral edges of each lateral face of each prism-shaped tooth are configured to rise parallel to each other or at a crossing angle of within ±10 degrees from the parallel.

10. The handsaw according to claim 9, wherein the lateral edges of each lateral face of each prism-shaped tooth are configured to rise parallel to each other or at a crossing angle of within ±5 degrees from the parallel.

* * * * *